US012793694B2

(12) United States Patent
De Bruijn

(10) Patent No.: US 12,793,694 B2
(45) Date of Patent: Nov. 10, 2026

(54) DERIVING PARAMETERS FOR A REVERBERATION PROCESSOR

(71) Applicant: Telefonaktiebolaget LM Ericsson (publ), Stockholm (SE)

(72) Inventor: Werner De Bruijn, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 273 days.

(21) Appl. No.: 18/687,720

(22) PCT Filed: Aug. 30, 2022

(86) PCT No.: PCT/EP2022/074057
§ 371 (c)(1),
(2) Date: Feb. 28, 2024

(87) PCT Pub. No.: WO2023/031182
PCT Pub. Date: Mar. 9, 2023

(65) Prior Publication Data

US 2024/0420675 A1 Dec. 19, 2024

Related U.S. Application Data

(60) Provisional application No. 63/273,510, filed on Oct. 29, 2021, provisional application No. 63/239,143, filed on Aug. 31, 2021.

(51) Int. Cl.
*G10K 15/08* (2006.01)

(52) U.S. Cl.
CPC .................................... *G10K 15/08* (2013.01)

(58) Field of Classification Search
CPC ...................................................... G10K 15/08
See application file for complete search history.

(56) References Cited

U.S. PATENT DOCUMENTS 10,880,668 B1 * 12/2020 Robinson ................ H04S 7/307
11,212,638 B2 12/2021 Yen et al.

FOREIGN PATENT DOCUMENTS

JP 2015-161814 A 9/2015
JP 2017-507525 A 3/2017
WO 2018/211988 A1 11/2018

OTHER PUBLICATIONS

International Search Report and Written Opinion dated Dec. 13, 2022 in International Application No. PCT/EP2022/074057 (15 pages).

(Continued)

*Primary Examiner* — Daniel R Sellers
(74) *Attorney, Agent, or Firm* — Rothwell, Figg, Ernst & Manbeck, P.C.

(57) ABSTRACT

A method (300) performed by an audio renderer (151). The method includes obtaining (s302) metadata for an extended reality scene. The method also includes obtaining (s304) from the metadata, or deriving from the metadata, a first reverberation parameter, wherein the first reverberation parameter is a reverberation time parameter or a reverberation level parameter. The method also includes using (s306) the first reverberation parameter to derive a second reverberation parameter. When the first reverberation parameter is the reverberation time parameter, the second reverberation parameter is a reverberation level parameter, and when the first reverberation parameter is the reverberation level parameter, the second reverberation parameter is a reverberation time parameter.

24 Claims, 5 Drawing Sheets

(56) References Cited

OTHER PUBLICATIONS

International Preliminary Report on Patentability and Written Opinion dated Mar. 5, 2024 in International Application No. PCT/EP2022/074057 (12 pages).
"Draft MPEG-I Immersive Audio Encoder Input Format", Jan. 15, 2021, ISO/IEC JTC 1/SC 29/WG 6 MPEG Audio Coding Convenorship: US, 1S0/IEC, JTC 1/SC 29/WG 6, N0029, XP030290174 (35 pages).
"MPEG-I Immersive Audio CfP Supplemental Information, Recommendations and Clarifications, Version 1", Jul. 16, 2021, ISO/IEC JTC 1 /SC 29/WG 6 MPEG Audio Coding Convenorship: US, 1S0/IEC, JTC 1/SC 29/WG 6, N0083, XP030296417 (7 pages).
Koppens, J. et al., "EIF issues with AcousticEnvironment nodes", International Organisation for Standardisation Organisation Internationale De Normalisation ISO/IEC JTC1/SC29/WG6, MPEG Audio Coding, ISO/IEC JTC1/SC29/WG6 M56564, Apr. 2021, Virtual, XP030295056 (6 pages).
"Critical distance", ASA Acoustical Society of America Standards, The Wayback Machine—https://web.archive.org/web/20220703234631/https://asastandards.org/terms/critical-d (Jul. 3, 2022) (3 pages).
"Critical distance", Wikipedia, The Wayback Machine—https://en.wikipedia.org/w/index.php?title=Critical_distance&oldid=991557540 (Mar. 7, 2021) (2 pages).
Eronen et al., "On next steps for MPEG-I immersive audio", ISO/IEC JTC1/SC29/WG6 M73357, Jul. 2025, Daejeon, ROK (4 pages).
"MPEG-I Immersive Audio Encoder Input Format", ISO/IEC JTC 1/SC 29/WG 6, N0054, Apr. 30, 2021 (36 pages).

* cited by examiner

DERIVING PARAMETERS FOR A REVERBERATION PROCESSOR

CROSS REFERENCE TO RELATED APPLICATIONS

This application is a 35 U.S.C. § 371 National Stage of International Patent Application No. PCT/EP2022/074057, filed 30 Aug. 2022, which claims priority to: i) U.S. provisional patent application No. 63/239,143, filed 31 Aug. 2021 and ii) U.S. provisional patent application No. 63/273,510, filed 29 Oct. 2021. The above identified provisional applications are incorporated by this reference.

TECHNICAL FIELD

Disclosed are embodiments related to deriving parameters for a reverberation processor.

BACKGROUND

Extended reality (XR) (e.g., a virtual reality (VR), augmented reality (AR), mixed reality (MR), etc.) systems generally include an audio renderer for rendering audio to the user of the XR system. The audio renderer typically contains a reverberation processor to generate late and/or diffuse reverberation that is rendered to the user of the XR system to provide an auditory sensation of being in the XR scene that is being rendered. The generated reverberation should provide the user with the auditory sensation of being in the acoustical environment corresponding to the XR scene (e.g., a church, a living room, a gym, an outdoor environment, etc.).

Reverberation is one of the most significant acoustic properties of a room. Sound produced in a room will repeatedly bounce off reflective surfaces such as the floor, walls, ceiling, windows or tables while gradually losing energy. When these reflections mix with each other, the phenomena known as "reverberation" is created. Reverberation is thus a collection of many reflections of sound.

Two of the most fundamental characteristics of the reverberation in any acoustical environment, real or virtual, are: 1) the reverberation time and 2) the reverberation level, i.e., how strong or loud the reverberation is (e.g., relative to the power or direct sound level of sound sources in the space). Both of these are properties of the acoustical environment only, i.e., they do not depend on individual sound sources.

The reverberation time is a measure of the time required for reflected sound to "fade away" in an enclosed space after the source of the sound has stopped. It is important in defining how a room will respond to acoustic sound. Reverberation time depends on the amount of acoustic absorption in the space, being lower in spaces that have many absorbent surfaces such as curtains, padded chairs or even people, and higher in spaces containing mostly hard, reflective surfaces.

Conventionally, the reverberation time is defined as the amount of time the sound pressure level takes to decrease by 60 dB after a sound source is abruptly switched off. The shorthand for this amount of time is "RT60" (or, sometimes, T60).

Typically, for a reverberation processor used in an audio renderer, these two (and other) characteristics of generated reverberation may be controlled individually and independently. For example, it is typically possible to configure the reverberation processor to generate reverberation with a certain desired reverberation time and a certain desired reverberation level.

In an XR system, the characteristics of the generated reverberation are typically controlled by control information, e.g., special metadata contained in the XR scene description, e.g., as specified by the scene creator, which describes many aspects of the XR scene including its acoustical characteristics. The audio renderer receives this control information, e.g., from a bitstream or a file, and uses this control information to configure the reverberation processor to produce reverberation with the desired characteristics. The exact way in which the reverberation processor obtains the desired reverberation time and reverberation level in the generated reverberation may differ, depending on the type of reverberation algorithm that the reverberation processor uses to generate reverberation.

SUMMARY

Certain challenges presently exist. For example, as noted above, it is typically possible to control the various characteristics of the generated reverberation (e.g., reverberation time and reverberation level) individually and independently from each other; while this provides a large degree of flexibility in generating reverberation, it also leads to a potential problem. In practice, the XR control information that is received by the audio renderer may not contain control data for all the characteristics of the generated reverberation that can be controlled. There can be many reasons for this. For example, the authoring software that was used to create the XR scene may only produce a limited set of acoustical properties for the acoustical environments. Or the scene corresponds to a real-life location (e.g., a specific famous church) for which only a limited set of acoustical data is available. In an AR context, where the XR scene corresponds to the real physical space of the user, the acoustical properties of that space need to be determined on the spot, typically with the limited technical means available in the user's XR equipment.

As explained above, the two most critical characteristics of the generated reverberation are the reverberation time, typically expressed in terms of RT60, and the reverberation level, commonly expressed as a reverberant-to-direct (RDR) energy ratio. If either the reverberation time or reverberation level is not specified in the control information that the audio renderer is provided with, then it is not clear how the reverberation processor should be configured.

In the context of an XR audio standard, even if the standard in principle supports the specification of many reverberation parameters for an acoustical environment, only some of those may be mandatory to provide with the XR scene, while others are optional. For example, in the ISO/IEC MPEG-I Immersive Audio standard that is currently being developed, an RT60 value is the only mandatory reverberation-related parameter for an acoustical environment, while the reverberation level parameter (e.g., expressed as an RDR energy ratio) is optional.

What is therefore needed is a solution for configuring a reverberation processor of an XR audio renderer in cases where either the reverberation time and/or reverberation level are not specified for the acoustical environment to be rendered, such that a reverberation signal with acoustically plausible characteristics is produced for the XR scene.

Accordingly, in one aspect there is provided a method performed by an audio renderer. In one embodiment, the method performed by the audio renderer includes obtaining (e.g., receiving or retrieving) metadata for an XR scene. The method also includes obtaining from the metadata, or deriving from the metadata, a first reverberation parameter, wherein the first reverberation parameter is a reverberation time parameter or a reverberation level parameter. And the method also includes using the first reverberation parameter to derive a second reverberation parameter. When the first reverberation parameter is the reverberation time parameter, the second reverberation parameter is a reverberation level parameter, and when the first reverberation parameter is the reverberation level parameter, the second reverberation parameter is a reverberation time parameter.

In one embodiment, the method performed by the audio renderer includes obtaining, from metadata for an extended reality scene, a set of reverberation parameters including at least a first reverberation parameter and a second reverberation parameter. The method also includes determining whether the first reverberation parameter is consistent with the second reverberation parameter. The determining step comprises calculating a first value using the second reverberation parameter and comparing a difference between the first value and the first reverberation parameter to a threshold.

In another aspect there is provided a computer program comprising instructions which when executed by processing circuitry of an audio renderer causes the audio renderer to perform either of the above described methods. In one embodiment, there is provided a carrier containing the computer program wherein the carrier is one of an electronic signal, an optical signal, a radio signal, and a computer readable storage medium. In another aspect there is provided a rendering apparatus that is configured to perform either of the above described methods. The rendering apparatus may include memory and processing circuitry coupled to the memory.

An advantage of the embodiments disclosed herein is that they enable an audio renderer to provide both a reverberation time value and a reverberation level value to the reverberation processor (which may be a part of the audio renderer itself, or may be external to it), thereby enabling the reverberation processor to produce a suitable reverberation signal for the XR scene.

BRIEF DESCRIPTION OF THE DRAWINGS

The accompanying drawings, which are incorporated herein and form part of the specification, illustrate various embodiments.

DETAILED DESCRIPTION

Figure 1A:
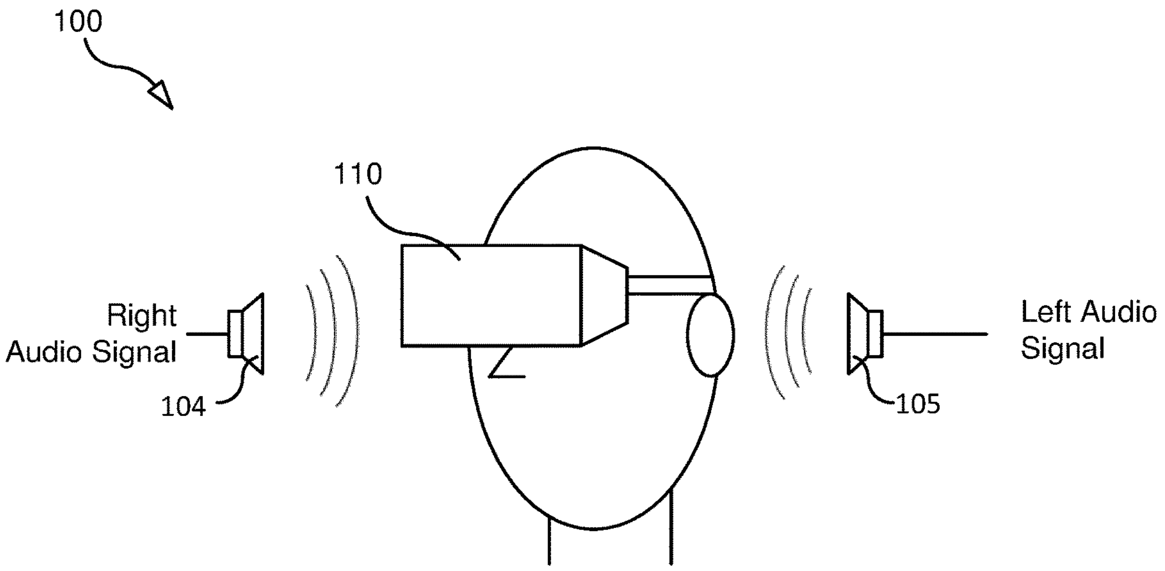
FIG. 1A shows a system according to some embodiments

FIG. 1A illustrates an XR system 100 in which the embodiments disclosed herein may be applied. XR system 100 includes speakers 104 and 105 (which may be speakers of headphones worn by the user) and an XR device 110 that may include a display for displaying images to the user and that, in some embodiments, is configured to be worn by the listener. In the illustrated XR system 100, XR device 110 has a display and is designed to be worn on the user's head and is commonly referred to as a head-mounted display (HMD).

Figure 1B:
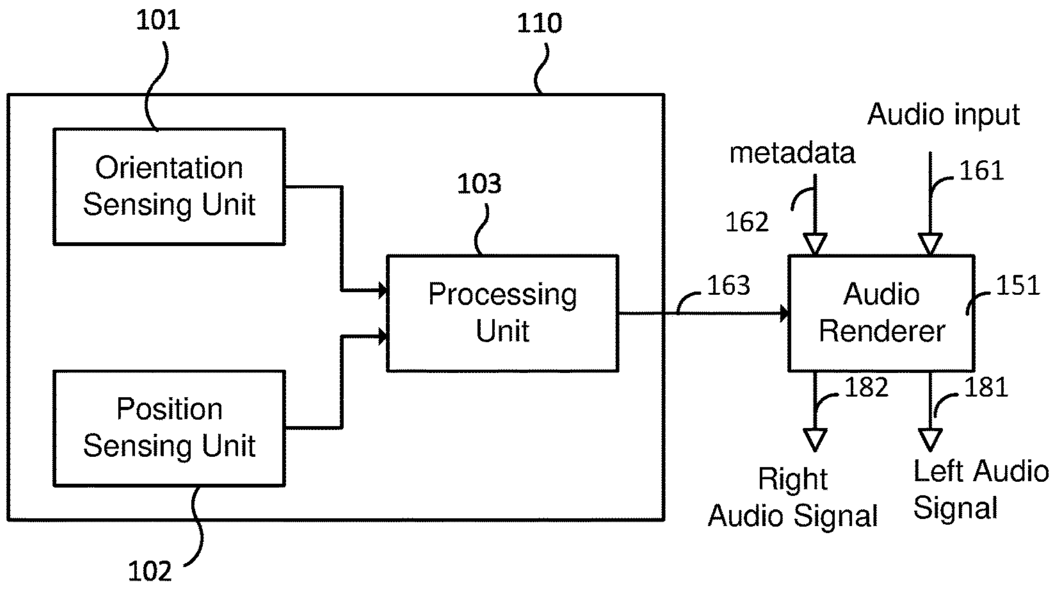
FIG. 1B shows a system according to some embodiments.

As shown in FIG. 1B, XR device 110 may comprise an orientation sensing unit 101, a position sensing unit 102, and a processing unit 103 coupled (directly or indirectly) to an audio render 151 for producing output audio signals (e.g., a left audio signal 181 for a left speaker and a right audio signal 182 for a right speaker as shown).

Orientation sensing unit 101 is configured to detect a change in the orientation of the listener and provides information regarding the detected change to processing unit 103. In some embodiments, processing unit 103 determines the absolute orientation (in relation to some coordinate system) given the detected change in orientation detected by orientation sensing unit 101. There could also be different systems for determination of orientation and position, e.g. a system using lighthouse trackers (lidar). In one embodiment, orientation sensing unit 101 may determine the absolute orientation (in relation to some coordinate system) given the detected change in orientation. In this case the processing unit 103 may simply multiplex the absolute orientation data from orientation sensing unit 101 and positional data from position sensing unit 102. In some embodiments, orientation sensing unit 101 may comprise one or more accelerometers and/or one or more gyroscopes.

Audio renderer 151 produces the audio output signals based on input audio signals 161, metadata 162 regarding the XR scene the listener is experiencing, and information 163 about the location and orientation of the listener. The metadata 162 for the XR scene may include metadata for each object and audio element included in the XR scene, and the metadata for an object may include information about the dimensions of the object and occlusion factors for the object (e.g., the metadata may specify a set of occlusion factors where each occlusion factor is applicable for a different frequency or frequency range). The metadata 162 may also include control information, such as a reverberation time value, a reverberation level value, and/or an absorption parameter.

Audio renderer 151 may be a component of XR device 110 or it may be remote from the XR device 110 (e.g., audio renderer 151, or components thereof, may be implemented in the cloud).

Figure 2:
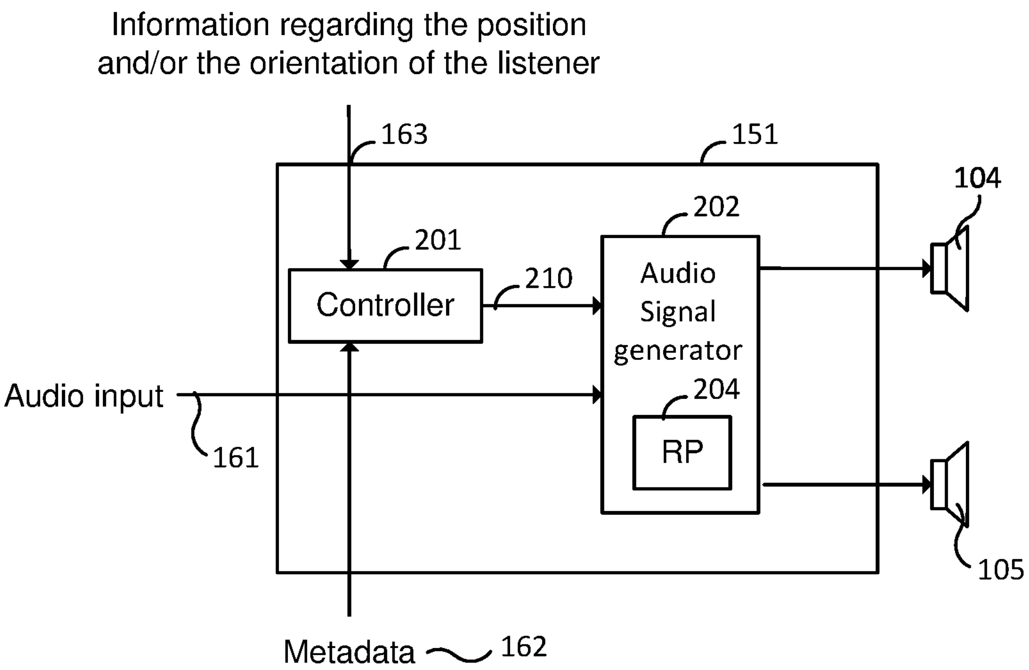
FIG. 2 illustrates a system according to some embodiments.

FIG. 2 shows an example implementation of audio renderer 151 for producing sound for the XR scene. Audio renderer 151 includes a controller 201 and an audio signal generator 202 for generating the output audio signal(s) (e.g., the audio signals of a multi-channel audio element) based on control information 210 from controller 201 and input audio 161. In this embodiment, audio signal generator 202 comprises a reverberation processor 204 for producing a reverberation signal.

In some embodiments, controller 201 may be configured to receive one or more parameters and to trigger audio signal generator 202 to perform modifications on audio signals 161 based on the received parameters (e.g., increasing or decreasing the volume level). The received parameters include information 163 regarding the position and/or orientation of the listener (e.g., direction and distance to an audio element), and metadata 162 regarding the XR scene. For example, metadata 162 may include metadata regarding the XR space in which the user is virtually located (e.g., dimensions of the space, information about objects in the space and information about acoustical properties of the space) as well as metadata regarding audio elements and metadata regarding an object occluding an audio element. In some embodiments, controller 201 itself produces at least a portion of the metadata 162. For instance, controller 201 may receive metadata about the XR scene and derive additional metadata (e.g., control parameters) based on the received metadata. For instance, using the metadata 162 and position/orientation information 163, controller 201 may calculate one or more gain factors (g) for an audio element in the XR scene.

With respect to the generation of a reverberation signal that is used by signal generator 202 to produce the final output signals, controller 201 provides to reverberation processor 204 reverberation parameters, such as, for example, reverberation time and reverberation level so that reverberation processor 204 is operable to generate the reverberation signal. The reverberation time for the generated reverberation is most commonly provided to the reverberation processor 204 as an RT60 value, although other reverberation time measures exist and can be used as well. In some embodiments, the metadata 162 includes some or all of the necessary reverberation parameters (e.g., RT60) value and reverberation level value). But in embodiments in which the metadata does not include a reverberation time parameter (i.e., an RT value such as an RT60 value) or reverberation level parameter (i.e., RL value such as an RDR energy ratio), controller 201 is configured to generate these parameters. For instance, as described herein, controller 201 can generate a reverberation time parameter based on a reverberation level parameter and vice-versa.

The reverberation level may be expressed and provided to the reverberation processor 204 in various formats. For example, it may be expressed as an energy ratio between direct sound and reverberant sound components (DRR) or it's inverse (i.e., the RDR energy ratio) at a certain distance from a sound source that is rendered in the XR environment. Alternatively, the reverberation level may be expressed in terms of an energy ratio between reverberant sound and total emitted energy of a source. In yet other cases, the reverberation level may be expressed directly as a level/gain for the reverberation processor.

In this context, the term "reverberant" may typically refer to only those sound field components that correspond to the diffuse part of the acoustical room impulse response of the acoustic environment, but in some embodiments it may also include sound field components corresponding to earlier parts of the room impulse response, e.g., including some late non-diffuse reflections, or even all reflected sound.

Other metadata describing reverberation-related characteristics of the acoustical environment that may be included in the metadata 162 include parameters describing acoustic properties of the materials of the environment's surfaces (describing, e.g., absorption, reflection, transmission and/or diffusion properties of the materials), or specific time points of the room impulse response associated with the acoustical environment, e.g. the time after the source emission after which the room impulse response becomes diffuse (sometimes called "pre-delay").

All reverberation-related properties described above are typically frequency-dependent, and therefore their related metadata parameters are typically also provided and processed separately for a number of frequency bands.

In authoring a virtual reality sound scene it is, in principle, possible to specify a reverberation time and reverberation level individually and independently for the virtual acoustical environment. In real-life acoustical environments, however, reverberation time and reverberation level are not independent properties. Although there is not a 1-1 relationship between the two, it is possible to derive relationships between them that, although not completely accurate in all cases, at least enable one to derive a plausible estimate for the reverberation level if only information about the reverberation time is available, and vice versa.

The derivation of one such relationship starts from the definition of the "critical distance (CD)," which is the distance in meters at which the sound pressure levels of the direct sound field and the reverberant sound field are equal. Assuming that the reverberant sound field is totally diffuse, CD can be quantified as:

$$CD = \frac{1}{4}\sqrt{\frac{\gamma A}{\pi}}, \qquad \text{(Eq. 1)}$$

where $\gamma$ is the degree of directivity of the sound source, and A is the equivalent absorption surface in $m^2$ (which quantifies the total amount of acoustical absorption in the acoustical environment).

Using Sabine's well-known statistical approximation formula for RT60:

$$RT60 \approx \frac{V}{6A}, \qquad \text{(Eq. 2)}$$

where V is the volume of the acoustical environment in $m^3$, CD can be expressed in terms as RT60 as:

$$CD \approx 0.057\sqrt{\frac{\gamma V}{RT60}}. \qquad \text{(Eq. 3)}$$

Accordingly, for a given source directivity type (e.g., omnidirectional source, for which $\gamma=1$), the critical distance CD is purely a property of the acoustical environment.

The reverberation level of the acoustical environment can be expressed in terms of the ratio of reverberant and direct sound energy (i.e., the RDR energy ratio) at a distance d from an omnidirectional point sound source. In that case, there is a simple relationship between the RDR energy ratio (denoted RDR in the equations) and the critical distance (denoted CD in the equations):

$$RDR = \left(\frac{d}{CD}\right)^2. \qquad \text{(Eq. 4)}$$

This relationship arises because the energy of the direct sound of an omnidirectional point source varies with the square of the distance and because the RDR energy ratio should be equal to 1 at the critical distance.

Combining equations (3) and (4), one obtains an approximate relationship between the RDR energy ratio and RT60:

$$RDR \approx (3.1 \times 10^2) \times d^2 \times \left(\frac{RT60}{V}\right), \qquad \text{(Eq. 5)}$$

where we have used the fact that $\gamma=1$ for an omnidirectional source. If RDR is defined to be the energy ratio at 1 meter distance from the omnidirectional source, then equation (5) further simplifies to:

$$RDR \approx (3.1 \times 10^2) \times \left(\frac{RT60}{V}\right). \quad \text{(Eq. 6)}$$

Equation (6) shows that an estimate for the RDR energy ratio can be obtained from RT60 and the volume V of the acoustical environment, and that the approximate relationship between the RDR energy ratio and RT60 is a very simple linear one.

Likewise, equation (6) also enables to estimate RT60 from a known value of the RDR energy ratio.

When equations (1) and (4) are combined, an approximate expression of the RDR energy ratio in terms of the amount of acoustical absorption in the acoustical environment is obtained as:

$$RDR = 16 \times \left(\frac{\pi}{A}\right). \quad \text{(Eq. 7)}$$

The equivalent absorption surface A of the acoustical environment may be provided directly in the scene metadata, or it may be derived from other parameters comprised in the scene metadata, e.g., from a specification of materials or material properties (e.g., absorption coefficients) specified for individual parts of the acoustical environment (e.g., the individual walls, the floor, the ceiling, etc.).

The derived equations above now make it possible for controller 201 to configure reverberation processor 204 in cases where either or both the reverberation time or reverberation level are not specified for the acoustical environment to be rendered, such that a reverberation signal with acoustically plausible characteristics is produced for the scene.

As mentioned, the exact way in which the reverberation processor 204 obtains the desired reverberation time and reverberation level in the generated reverberation may differ, depending on the type of reverberation algorithm that the reverberation processor uses to generate reverberation. Common examples of such algorithms include feedback delay networks (FDN) (simulating the reverberation process using delay lines, filters, and feedback connections) and convolution algorithms (convolving a dry input signal with a measured, approximated, or simulated room impulse response (RIR)).

As an example, for an FDN-based reverberation processor the desired reverberation time may be obtained by controlling the amount of feedback used. For a convolution-based reverberation processor, the desired reverberation time may be obtained either by loading a specific RIR having that reverberation time, or by adapting the effective length of a generic RIR (e.g. by filtering and time-windowing the generic RIR).

For both the FDN-based and convolution-based reverberation processor, the reverberation level may be controlled by applying an appropriate gain on either the input signal going into the reverberation processor, the output of the reverberation processor, or internally in the reverberation processor (e.g. applying an overall gain to the FDN structure or RIR, respectively).

An example of how this gain can be set in order to obtain the desired reverberation level (e.g., the desired RDR energy ratio) for a reverberation level that is expressed as the RDR energy ratio at 1 meter from an omnidirectional point source is described in, for example, U.S. provisional patent application No. 63/217,076, filed on Jun. 30, 2021 and international patent application no. PCT/EP2022/068015, filed on Jun. 30, 2022 (both of which are incorporated by this reference). The renderer performs a calibration procedure in which it adjusts the gain of the reverberation processor such that the rendered direct sound and reverberation components for an omnidirectional point source have the desired energy ratio at a distance of 1 meter from the source.

The renderer then generates an output signal for the user, by combining (e.g., summing) the generated reverberation signal with other signal components for the sound source, e.g. the direct sound component and early reflection components (both generated in other parts of the renderer).

As mentioned, the relationships between RT60, room geometry and RDR energy ratio used above to derive an RDR energy ratio from RT60 or vice versa are approximations that assume a diffuse reverberant sound field. This assumption is usually not fully valid in real acoustical spaces, and the more the real sound field deviates from a completely diffuse field, the less accurate the derived relationships will be. However, even though the diffuse field assumption is usually not fully valid, using the derived relationships in generating reverberation for a given virtual acoustical space typically results in a perceptually plausible reverberation for that space.

Typically, the deviation from the diffuse field assumption will be larger for smaller rooms, and rooms with a high amount of absorption, and so, for smaller and highly absorbent rooms, the relationships derived above will less accurately predict the real relationship between the reverberation time and reverberation level. For rendering the acoustics of a virtual space this may not be a problem, since as mentioned the result from using the relationship will typically still sound plausible, and there is no real-life reference to compare to. However, in augmented reality (AR) use cases, where virtual sources are rendered such that they appear to be in the same physical space as the user, it is desirable to make the perceptual match between the reverberation of the real-life physical space and the generated reverberation as close as possible. In that case (and other cases in which an optimal match between the real and generated reverberation is desired), it is possible to enhance the accuracy of the derived relationships by adding a correction factor that depends on the room geometry (e.g., room volume, one or more room dimensions, ratio between largest and smallest dimension, etc.), RT60, and/or absorption properties of the acoustical environment (when available), and/or frequency. For example, equation (6) can be enhanced as:

$$RDR \approx C \times (3.1 \times 10^2) \times \left(\frac{RT60}{V}\right), \quad \text{(Eq. 8)}$$

where C is the correction factor. The correction factor may be close to one for acoustical environments that are large and have a small amount of absorption, and may deviate from one for rooms that are small and/or have a large amount of absorption. Typically, it will be smaller than one in such cases.

Optionally, equation (6) may further be enhanced by expressing the RDR energy ratio as a power of the ratio of RT60 and V, i.e.:

$$RDR \approx C \times (3.1 \times 10^2) \times \left(\frac{RT60}{V}\right)^{C_2}, \quad \text{(Eq. 9)}$$

where $C_2$ is a second correction factor that has a value of 1 for a fully diffuse room and may depend on any of the variables mentioned above for the correction factor C.

As a further example, the RDR energy ratio can be expressed as:

$$RDR \approx f1 \times \left(\frac{RT60}{V}\right)^{f2}, \quad \text{(Eq. 9a)}$$

wherein f1 is a first correction parameter and f2 is a second correction parameter. For instance f1 can equal: $3.1\times10^2$ or $((3.1\times10^2)\times d^2)$ or $(C\times(3.1\times10^2)$ or $(C\times(3.1\times10^2)\times d^2)$ and f2 can equal $C_2$.

In a further embodiment, equation (6) may be generalized to express that the RDR energy ratio is a function of the ratio of RT60 and V, i.e.:

$$RDR = f\left(\frac{RT60}{V}\right), \quad \text{(Eq. 10)}$$

with $f(\ )$ a function.

In further embodiments, equation (6) may be further generalized to express that the RDR energy ratio is a function of RT60 and V, i.e.: RDR=h (RT60, V) (Eq, 10a), with h( ) a function, or a function of RT60, i.e., RDR=j (RT60) (Eq. 10b), with j( ) a function.

In addition to correcting the relationships between the different reverberation parameters in cases where the reverberant sound field is not fully diffuse, the correction factors C and $C_2$ in equations 8 and 9 (as well as the correction parameters f1 and f2 in equation 9a and the functional relationships in equations (10), (10a) and (10b)), may also correct the derived relationships for other factors.

One example is where a renderer (implicitly) uses a definition of (or convention for measuring) the RDR energy ratio that is different (in one or more respects) from the definition that is assumed in the derivation of the equations (1)-(7) above.

Specifically, in the derivation of the equations (1)-(7) above, which assume a fully diffuse reverberant field, it is implicitly assumed that the energy of the reverberant field that is used to calculate the RDR energy ratio is determined over the full length of the room impulse response, since in a theoretical diffuse field the room response is diffuse from the start (i.e., directly after the direct sound has been emitted by the source).

A specific renderer, on the other hand, may instead (implicitly) use a slightly different definition of the RDR energy ratio, in which the reverberant energy component of the RDR energy ratio only includes the energy contained in the part of the room impulse response starting from a certain time instant indicated by the value t1.

One reason for this design choice may be that in real-world spaces, the reverberant field only starts to become really diffuse a certain amount of time after the emission of the direct sound by the source. This amount of time may depend on various factors, such as the geometry of the room, e.g., its volume, size of one (e.g., the longest) or more of its dimensions, or ratios of its dimensions, as well as on acoustical parameters such as the amount of absorption and the RT60. A definition of the RDR energy ratio that only takes the reverberant energy after a time identified by t1 into account may be used to reflect that physical reality. Another reason may be that the output response of the reverberation processor that is part of (or used by) the renderer itself only starts to become diffuse some time after feeding the reverberation processor with a direct sound signal. So, for either of these or other reasons, the renderer may use a definition for the RDR energy ratio in which only the energy after a certain time instant is included in the reverberant energy component of the RDR energy ratio.

As a consequence of this choice, the resulting value of the RDR energy ratio will be smaller than both the value predicted from equations (1)-(7) above, as well as the value that would be obtained if the reverberant energy of the full room response would be included in the reverberant energy component of the RDR energy ratio (i.e., t1=0).

Another example is where a renderer only starts to render the reverberation a certain time t1 after the emission of the direct sound by the source, for example, because of the fact that in real-world spaces the reverberant field only starts to become diffuse a certain amount of time after the emission by the source, as explained above. This has the same effect on the value of the RDR energy ratio as described in the example above.

Figure 5:
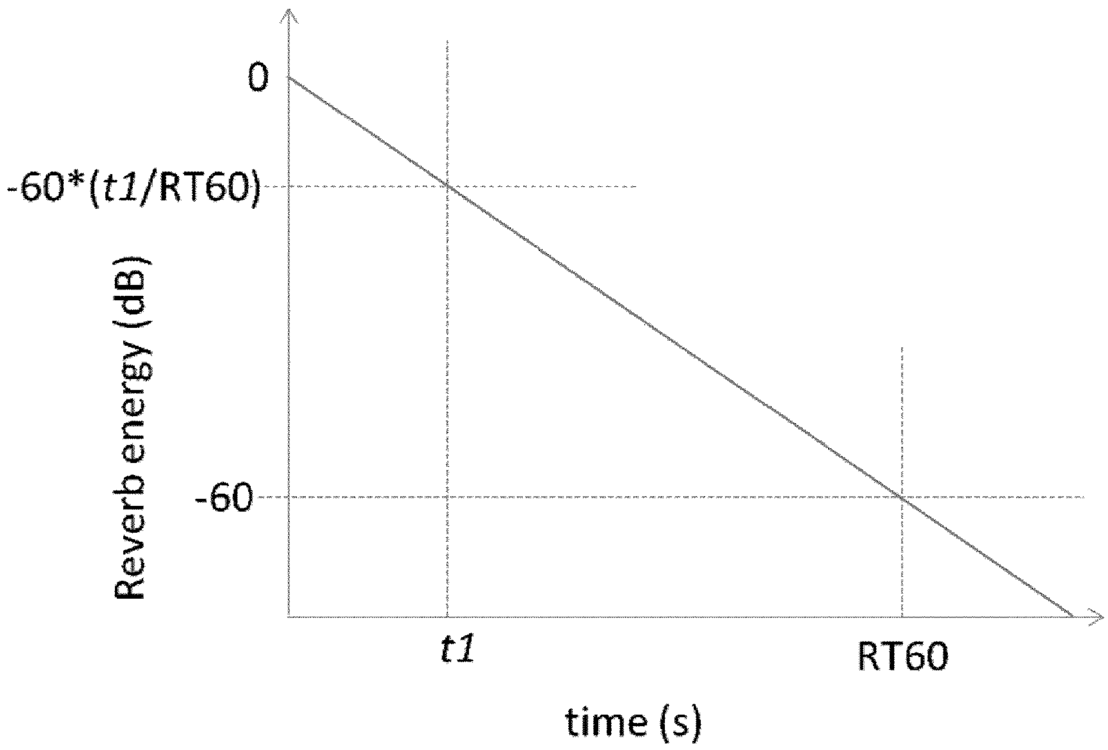
FIG. 5 illustrates an energy decay curve.

It is possible to modify the equation (6) to include the effect of only including the reverberant energy from a certain time identified by the value t1 onwards in the reverberant energy component of the RDR energy ratio. As one example of this, we can look at the energy decay curve for a fully diffuse field and determine the amount of energy that is "missed" by only including the reverberant energy after the time identified by t1. On a logarithmic (dB) scale, the energy decay curve for a fully diffuse field is a straight line (see FIG. 5) with a slope of −60/RT60 (dB/s). This means that if the part of the diffuse response before time t1 is left out, this will lead to a reduction of the calculated reverberant energy, compared to using the full length of the diffuse response, of:

$$-60\times\left(\frac{t1}{RT60}\right)(\text{dB}). \quad \text{(Eq. 11)}$$

We can now compensate for the different starting time of the reverberant energy by applying the correction of equation (11) to the "fully diffuse" RDR energy ratio predicted according to equation (6). Specifically, we multiply equation (6) by the linear-scale version of equation (11):

$$RDR \approx 10^{-\left(\frac{6t1}{RT60}\right)}\times(3.1\times10^2)\times\left(\frac{RT60}{V}\right). \quad \text{(Eq. 12)}$$

Comparing equation (12) to equation (8), we see that this correction may be incorporated in the correction factor C (i.e., $C=10^{-(6t1/RT60)}$).

Figure 6:
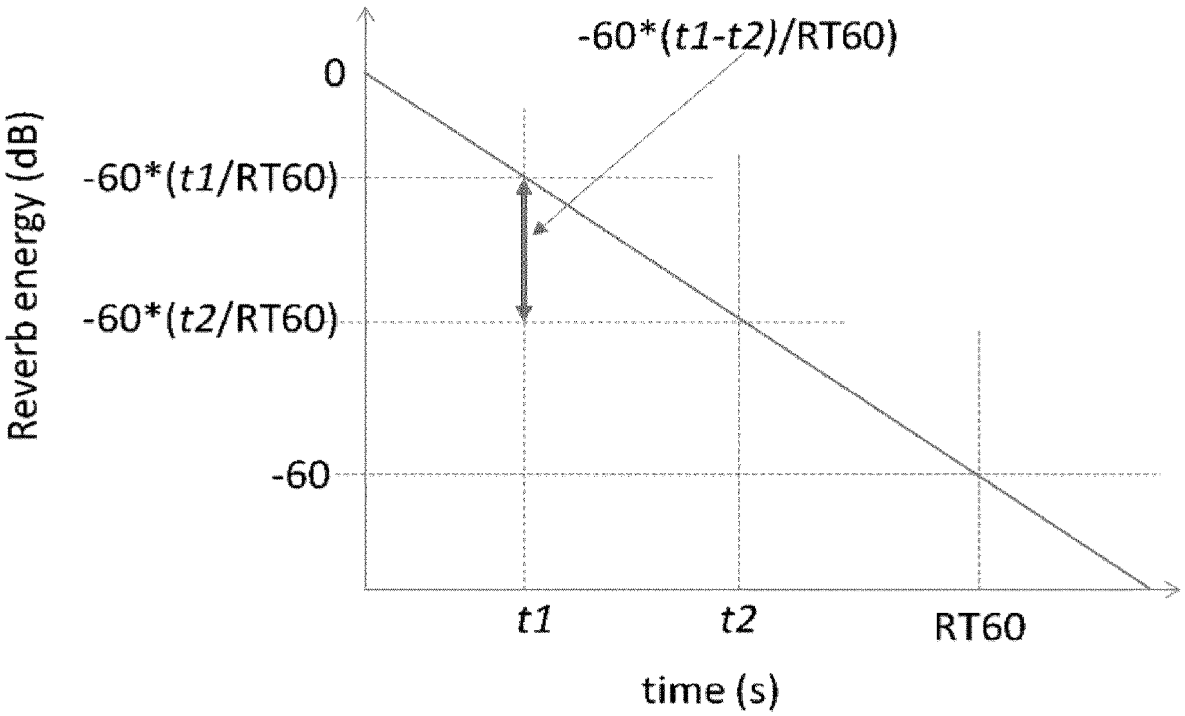
FIG. 6 illustrates an energy decay curve.

Essentially the same correction method as described above can also be used to modify an RDR energy ratio value (or "RDR value" for short) that is received by the renderer, in use cases where the received RDR value was determined using (or implicitly assuming) a certain starting time t2 for the reverberant energy component that is different from the starting time t1 that the renderer itself (implicitly) uses. In this case, the RDR value according to the renderer's definition may be derived by modifying the received RDR value by the correction factor of equation (11), where t1 is now replaced by (t1−t2), i.e. (see FIG. 6):

$$-60\times\left(\frac{t1-t2}{RT60}\right)(\text{dB}). \quad \text{(Eq. 11a)}$$

Accordingly, the modified RDR value (i.e., the RDR value according to the renderer's own definition), may now be calculated as:

$$RDR_{modified} = 10^{-\left(\frac{6(t1-t2)}{RT60}\right)} \times RDR_{received}. \quad \text{(Eq. 12a)}$$

If the time parameter t2 for the received RDR value is larger than the renderer's own time parameter t1, then the result of the modification is that the received RDR value is increased, whereas it is decreased if t2 is smaller than t1.

The starting time t2 corresponding to the received RDR value may be received by the renderer as additional metadata for the XR scene, or it may be obtained in any other way, e.g., implicitly from the fact that it is known that the received RDR value was determined according to a certain definition (e.g., because the XR scene is in a specific known, e.g., standardized, format). As one example of this, the MPEG-I Immersive Audio Encoder Input Format (ISO/IEC JTC1/SC29/WG6, document number N0083, "MPEG-I Immersive Audio CfP Supplemental Information, Recommendations and Clarifications, Version 1", July 2021) prescribes that t2 is equal to 4 times the acoustic time-of-flight associated with the longest dimension of the acoustical environment.

The reverberation time (e.g., RT60) and reverberation level (e.g., RDR value) are typically frequency-dependent and therefore specified for various frequency bands. This implies that all the equations and processing steps described above should be understood as possibly being evaluated and carried out, respectively, for different frequency bands as well.

While the equations above were derived for RDR energy ratio expressed on a linear energy scale, the RDR energy ratio may equally well be expressed on a logarithmic (dB) scale and equivalent logarithmic versions of the equations are easily derived.

Specifically, the logarithmic version of equation (6) is given by:

$$RDR_{log} \approx 10\log_{10}\left(\frac{RT60}{V}\right) + 25 \text{ (dB)}. \quad \text{(Eq. 13)}$$

while the logarithmic version of equation 9 is given by:

$$RDR_{log} \approx 10\log_{10}\left(C_2 \times \frac{RT60}{V}\right) + 10\log_{10}(C) + 25 \text{ (dB)}. \quad \text{(C)}$$

As a final example, the logarithmic version of equation (12) with the correction for starting the calculation of the reverberant energy at a time t1 is given by:

$$RDR_{log} \approx 10\log_{10}\left(\frac{RT60}{V}\right) - 60 \times \left(\frac{t1}{RT60}\right) + 25 \text{ (dB)}. \quad \text{(Eq. 15)}$$

In addition to providing a solution for configuring a reverberation processor in cases where either or both the reverberation time or reverberation level are not specified for an acoustical environment of an XR scene, the derived equations also make it possible to check if the provided values are mutually consistent in cases where at least two of the reverberation time, the reverberation level and the absorption information are provided. Of course, as explained above, the derived relationships are only approximate, so no exact consistency can be expected from using them, but at least it provides a means to do a "sanity check" on the provided data, i.e., to check if the combination of their values is plausible. (A note here is that the "plausibility" here is in terms of what occurs in real-world acoustical environments, while there is of course no reason why a virtual environment could not have acoustical properties that do not exist in the real world).

An audio renderer could use such a check in a number of ways. In one embodiment, the renderer could use the derived equations to check the provided parameters for mutual consistency, and if the consistency is worse than a threshold, to reject the value of at least one of the parameters and replace it with a value derived from the equations provided above. If all three parameters (reverberation time, reverberation level, and absorption information) are provided of which two are consistent and one is inconsistent, it is possible to deduce from the equations which one is the inconsistent one, and its value can be replaced. If only two of the parameters are provided, or if all three are provided and they are all mutually inconsistent, then a hierarchical rule can be used to decide which should be replaced. For example, reverberation time may be highest in hierarchy, reverberation level second, and absorption information third, so that if, e.g., reverberation time and reverberation level are provided and found to be inconsistent, the value of the reverberation level is rejected and replaced, while the value for the reverberation time is kept.

Figure 3A:
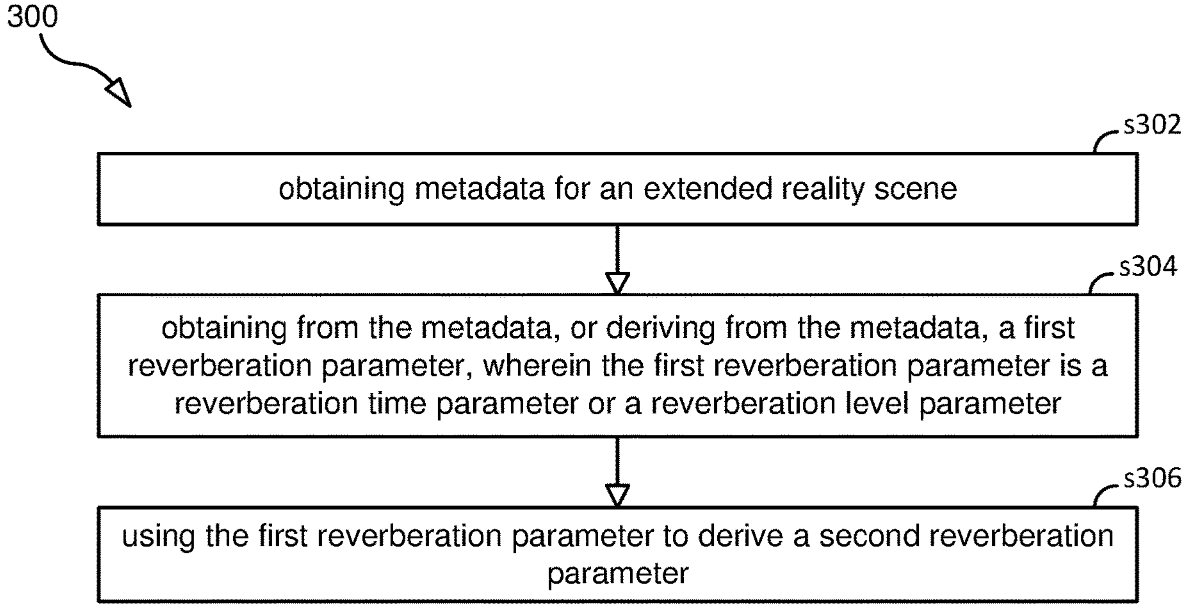
FIG. 3A is a flowchart illustrating a process according to an embodiment.

FIG. 3A is a flowchart illustrating a process 300 according to some embodiments. Process 300 may begin with step s302. Step s302 comprises obtaining metadata for an extended reality scene. Step s304 comprises obtaining from the metadata, or deriving from the metadata, a first reverberation parameter, wherein the first reverberation parameter is a reverberation time (RT) parameter (e.g., RT60) or a reverberation level (RL) parameter (e.g., RDR value). And step s306 comprises using the first reverberation parameter, to derive a second reverberation parameter. When the first reverberation parameter is the reverberation time parameter, the second reverberation parameter is a reverberation level parameter, and when the first reverberation parameter is the reverberation level parameter, the second reverberation parameter is a reverberation time parameter.

In some embodiments, the metadata comprises an acoustical absorption parameter that indicates an amount of acoustical absorption (denoted "A") and the first reverberation parameter is derived using the acoustical absorption parameter. In some embodiments, the first reverberation parameter is an RDR value, and deriving the RDR value comprises calculating: RDR=Y/A, where Y is a predetermined constant. In one embodiment, Y=16×π.

In some embodiments, the first reverberation parameter is the reverberation time parameter (RT) (e.g., RT60) and deriving the second reverberation parameter comprises calculating X×RT or RT/X, where X is a number. In some embodiments, the first and second reverberation parameters are associated with an acoustical environment having a volume, and deriving the second reverberation parameter comprises calculating: $f1\times(RT/V)^{f2}$. In some embodiments, deriving the second reverberation parameter comprises calculating: ƒ(RT/V), with ƒ( ) a function. In some embodiments, deriving the second reverberation parameter comprises calculating: h(RT, V), with h( ) a function. In some embodiments, deriving the second reverberation parameter comprises calculating: j(RT), with j( ) a function In some embodiments, the first reverberation parameter is the reverberation level parameter (RL) (e.g., and RDR value) and deriving the second reverberation parameter (i.e., the reverberation time parameter) comprises calculating: X×RL or RL/X, where X is a number. In some embodiments, the first and second reverberation parameters are associated with an acoustical environment having a volume, and deriving the second reverberation parameter comprises calculating: i) V×RL/f1 or ii) $V\times(RL/f1)^{1/f2}$. In some embodiments, deriving the second reverberation parameter comprises calculating: V×g (RL), with g( ) a function. The function g( ) may be the inverse of the function ƒ( ) i.e., $g(\ )=f^{-1}(\ )$. In some embodiments, deriving the second reverberation parameter comprises calculating: k(RL, V), with k( ) a function. The function k( ) may be the inverse of the function h( ). In some embodiments, deriving the second reverberation parameter comprises calculating: l(RL), with l( ) a function. The function l( ) may be the inverse of the function j( ).

In some embodiments, the process also includes generating a reverberation signal using the first and second reverberation parameters; and generating an output audio signal using the reverberation signal.

Figure 3B:
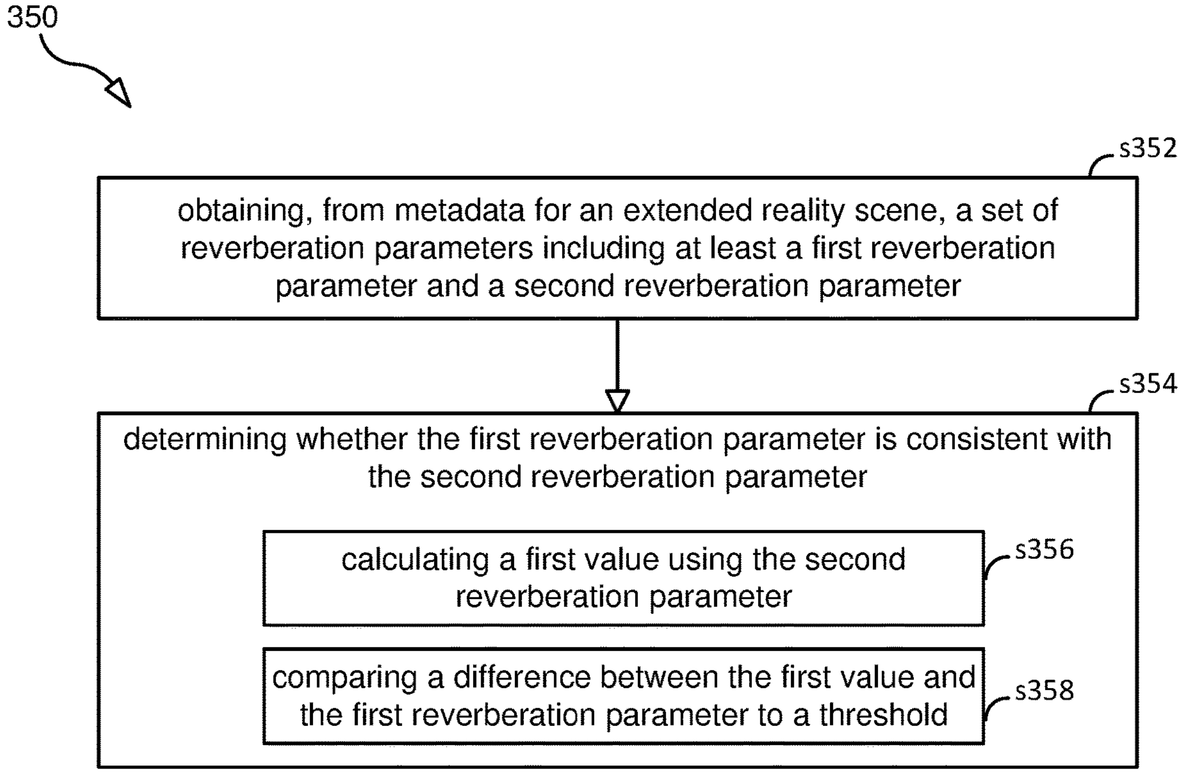
FIG. 3B is a flowchart illustrating a process according to an embodiment.

FIG. 3B is a flowchart illustrating a process 350 according to some embodiments. Process 350 may begin with step s352. Step s352 comprises obtaining, from metadata for an extended reality scene, a set of reverberation parameters including at least a first reverberation parameter and a second reverberation parameter. Step s354 comprises determining (s354) whether the first reverberation parameter is consistent with the second reverberation parameter. The determining comprises calculating (step s356) a first value using the second reverberation parameter; and comparing (step s358) a difference between the first value and the first reverberation parameter to a threshold.

In some embodiments, the process also includes, as a result of determining that the difference exceeds the threshold, generating a reverberation signal using the first value in place of the first reverberation parameter.

In some embodiments, i) the first reverberation parameter is a reverberation level parameter and the second reverberation parameter is either a reverberation time parameter or an absorption parameter, A, ii) the first reverberation parameter is the reverberation time parameter and the second reverberation parameter is either the reverberation level parameter or the absorption parameter, A, or iii) the first reverberation parameter is the absorption parameter and the second reverberation parameter is either the reverberation level parameter or the reverberation time parameter.

In some embodiments, the set of reverberation parameters further includes a third reverberation parameter, and the process further includes, as a result of determining that the first reverberation parameter is not consistent with the second reverberation parameter, determining whether the first reverberation parameter is consistent with the third reverberation parameter, wherein determining whether the first reverberation parameter is consistent with the third reverberation parameter comprises: i) calculating a second value using the third reverberation parameter and ii) comparing a difference between the second value and the first reverberation parameter to the threshold. In some embodiments, the process further includes as a result of determining that the first reverberation parameter is not consistent with either the second or third reverberation parameter, generating a reverberation signal using either the first value or the second value in place of the first reverberation parameter.

Figure 4:
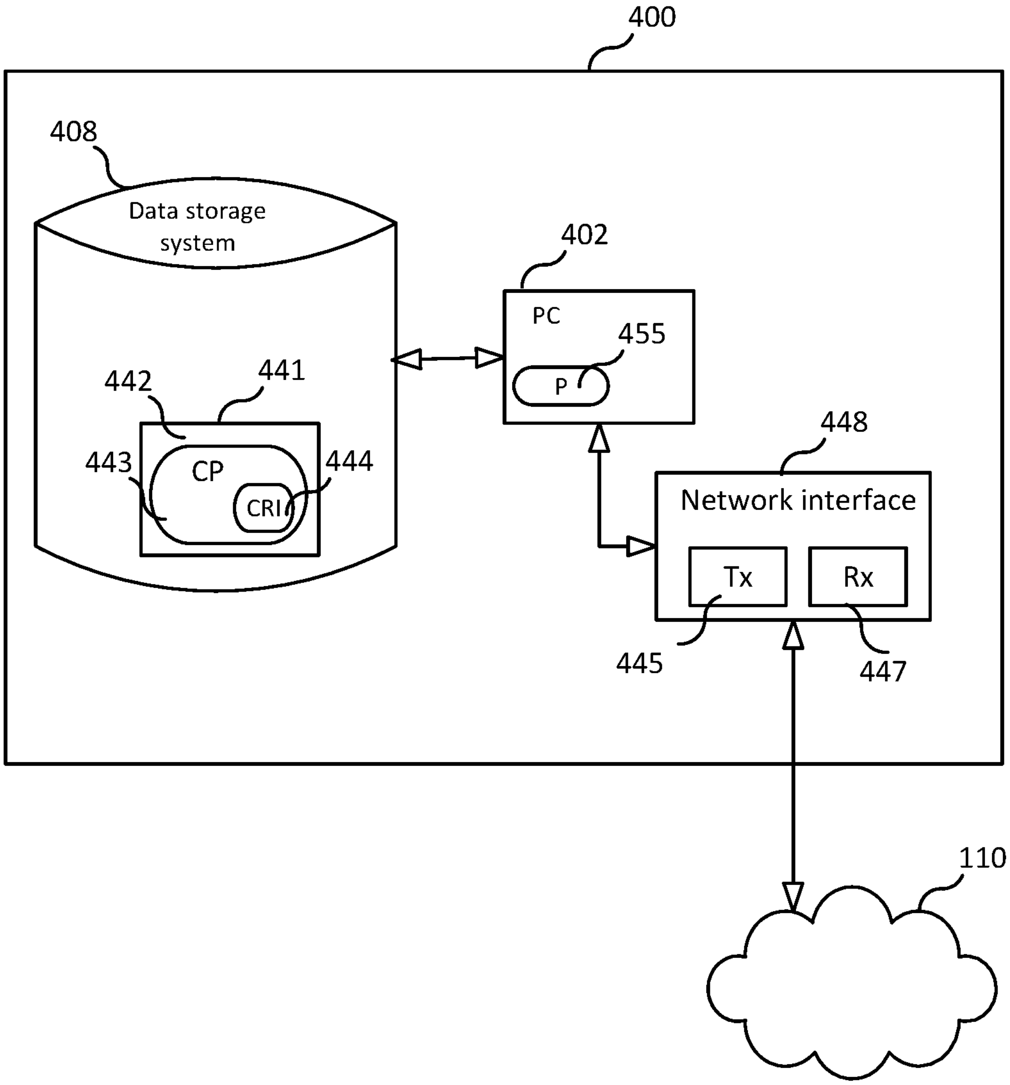
FIG. 4 is a block diagram of an apparatus according to some embodiments.

FIG. 4 is a block diagram of an audio rendering apparatus 400, according to some embodiments, for performing the methods disclosed herein (e.g., audio renderer 151 may be implemented using audio rendering apparatus 400). As shown in FIG. 4, audio rendering apparatus 400 may comprise: processing circuitry (PC) 402, which may include one or more processors (P) 455 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 400 may be a distributed computing apparatus): at least one network interface 448 comprising a transmitter (Tx) 445 and a receiver (Rx) 447 for enabling apparatus 400 to transmit data to and receive data from other nodes connected to a network 110 (e.g., an Internet Protocol (IP) network) to which network interface 448 is connected (directly or indirectly) (e.g., network interface 448 may be wirelessly connected to the network 110, in which case network interface 448 is connected to an antenna arrangement); and a storage unit (a.k.a., "data storage system") 408, which may include one or more non-volatile storage devices and/or one or more volatile storage devices. In embodiments where PC 402 includes a programmable processor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes audio rendering apparatus 400 to perform steps described herein (e.g., steps described herein with reference to the flow charts). In other embodiments, audio rendering apparatus 400 may be configured to perform steps described herein without the need for code. That is, for example, PC 402 may consist merely of one or more ASICs. Hence, the features of the embodiments described herein may be implemented in hardware and/or software.

Summary of Various Embodiments

A1. A method (300) performed by an audio renderer (151), the method comprising: obtaining (s302) metadata for an extended reality scene: obtaining (s304) from the metadata, or deriving from the metadata, a first reverberation parameter, wherein the first reverberation parameter is a reverberation time parameter or a reverberation level parameter; and using (s306) the first reverberation parameter, to derive a second reverberation parameter, wherein when the first reverberation parameter is the reverberation time parameter, the second reverberation parameter is a reverberation level parameter, and when the first reverberation parameter is the reverberation level parameter, the second reverberation parameter is a reverberation time parameter.

A2. The method of embodiment A1, wherein the metadata comprises an acoustical absorption parameter that indicates an amount of acoustical absorption, A, and the first reverberation parameter is derived using the acoustical absorption parameter.

A3. The method of embodiment A2, wherein the first reverberation parameter is a reverberant-to-direct energy ratio, RDR, value, and deriving the RDR value comprises calculating: RDR=16×(π/A).

A4. The method of embodiments A1 or A2, wherein the first reverberation parameter is the reverberation time parameter, RT (e.g., an RT60 value), and deriving the second reverberation parameter comprises calculating X×RT or RT/X, where X is a number.

A5. The method of embodiment A1 or A2, wherein the first reverberation parameter is the reverberation time parameter, RT (e.g., an RT60 value), the first and second reverberation parameters are associated with an acoustical environment having a volume, and deriving the second reverberation parameter comprises calculating: $f1\times(RT/V)^{f2}$ or f1×(RT/V), where f1 is a predetermined coefficient, f2 is a predetermined value (in some embodiments f2=1), and V is a volume value indicating the volume of the acoustical environment. In one embodiment, f1 is a function of a distance d from an omnidirectional point sound source. For example, f1 may be equal to $c\times d^2$, where c is a predetermined factor (e.g., $c=3.1\times10^2$). In another embodiment, f1 is equal to $3.1\times10^2$. In another embodiment, f1=C× c, where c is a predetermined factor (e.g., $c=3.1\times10^2$) and C is a predetermined coefficient.

A6. The method of any one of embodiments A1-A3, wherein the first reverberation parameter is the reverberation level parameter, RL, and deriving the second reverberation parameter comprises calculating: X×RL or RL/X, where X is a number.

A7. The method of embodiment A6, wherein the first and second reverberation parameters are associated with an acoustical environment having a volume, and deriving the second reverberation parameter comprises calculating: V×RL/f1 or $(V\times(RL/f1)^{1/f2})$, where f1 is a predetermined coefficient, V is a volume value indicating the volume of the acoustical environment, and f2 is a predetermined value.

A8. The method of embodiment A1 or A2, wherein the first and second reverberation parameters are associated with an acoustical environment having a volume, the first reverberation parameter is the reverberation time parameter, RT, and deriving the second reverberation parameter comprises calculating:

$$\log_{10}\left(\frac{RT}{V}\right) - 60\times\left(\frac{t1}{RT}\right) + 25\ (\text{dB}),$$

where V is the volume of the acoustical environment, and t1 is a time value.

A9. The method of any one of embodiment A1, A2, A4, or A5, wherein the second reverberation parameter is the reverberation level parameter, and the second reverberation parameter is derived using the first reverberation parameter and a predetermined time value, t1.

A10. The method of embodiment A5, wherein f1 is equal to C×c, where C is a correction factor that depends on the first reverberation parameter and a time value, t1, and c is a predetermined value.

A11. The method of embodiment A10, wherein C is equal to:

$$10^{-\left(\frac{6t1}{RT}\right)}.$$

A12. The method of any one of embodiments A8-A11, wherein t1 is derived based on at least one dimension of the acoustical environment.

A13. The method of any one of embodiments A8-A11, wherein t1 is proportional to the acoustic time-of-flight associated with a dimension of the acoustical environment.

A14. The method of embodiment A13, wherein t1=4×L/s, wherein L is the size of the longest dimension of the acoustical environment and s is speed of sound.

A15. The method of any one of embodiments A8-A11, wherein t1 indicates a pre-delay time associated with the acoustical environment.

A16. The method of any one of embodiments A8-A11, wherein t1 is a time value indicating a part of a room impulse response associated with the acoustical environment.

A17. The method of any one of embodiments A1-A16, wherein the reverberation level parameter is expressed in terms of an energy ratio between reverberant sound and total emitted energy of a source.

A18. The method of any one of embodiments A1-A17, further comprising: generating a reverberation signal using the first and second reverberation parameters; and generating an output audio signal using the reverberation signal.

B1. A method (350) performed by an audio renderer (151), the method comprising: obtaining (s352), from metadata for an extended reality scene, a set of reverberation parameters including at least a first reverberation parameter and a second reverberation parameter; and determining (s354) whether the first reverberation parameter is consistent with the second reverberation parameter, wherein the determining comprises: calculating (s356) a first value using the second reverberation parameter; and comparing (s358) a difference between the first value and the first reverberation parameter to a threshold.

B2. The method of embodiment B1, further comprising: as a result of determining that the difference exceeds the threshold, generating a reverberation signal using the first value in place of the first reverberation parameter.

B3. The method of embodiment B1 or B2, wherein the first reverberation parameter is a reverberation level and the second reverberation parameter is either a reverberation time or an absorption parameter, A, the first reverberation parameter is the reverberation time and the second reverberation parameter is either the reverberation level or the absorption parameter, A, or the first reverberation parameter is the absorption parameter and the second reverberation parameter is either the reverberation level or the reverberation time.

B4. The method of embodiment B1, wherein the set of reverberation parameters further includes a third reverberation parameter, and the method further comprises: as a result of determining that the first reverberation parameter is not consistent with the second reverberation parameter, determining whether the first reverberation parameter is consistent with the third reverberation parameter, wherein determining whether the first reverberation parameter is consistent with the third reverberation parameter comprises: calculating a second value using the third reverberation parameter; and comparing a difference between the second value and the first reverberation parameter to the threshold.

B5. The method of embodiment B4, further comprising: as a result of determining that the first reverberation parameter is not consistent with either the second or third reverberation parameter, generating a reverberation signal using either the first value or the second value in place of the first reverberation parameter.

C1. A computer program comprising instructions which when executed by processing circuitry of an audio renderer causes the audio renderer to perform the method of any one of the above embodiments.

C2. A carrier containing the computer program of embodiment C1, wherein the carrier is one of an electronic signal, an optical signal, a radio signal, and a computer readable storage medium.

D1. An audio rendering apparatus that is configured to perform the method of any one of the above embodiments.

D2. The audio rendering apparatus of embodiment D1, wherein the audio rendering apparatus comprises memory and processing circuitry coupled to the memory.

E1. A method performed by an audio renderer, the method comprising: obtaining (s302) metadata for an extended reality scene: obtaining from the metadata, or deriving from the metadata, a first reverberation level parameter; and using the first reverberation parameter to derive a second reverberation level parameter.

E2. The method of embodiment E1, wherein the method further includes obtaining a reverberation time parameter, RT, and the second reverberation level parameter is equal to:

$$10^{-\left(\frac{6(t1-t2)}{RT}\right)} \times RDR_{received},$$

where $RDR_{received}$ is the first reverberation level parameter, t1 is a starting time used by the audio renderer, and t2 is a starting time associated with the first reverberation level parameter (e.g. a starting time included in the metadata).

While various embodiments are described herein, it should be understood that they have been presented by way of example only, and not limitation. Thus, the breadth and scope of this disclosure should not be limited by any of the above described exemplary embodiments. Moreover, any combination of the above-described objects in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by an audio renderer, the method comprising:

obtaining metadata for an extended reality scene;

obtaining from the metadata, or deriving from the metadata, a first reverberation parameter, wherein the first reverberation parameter is a reverberation time parameter, an or an acoustical absorption parameter;

after obtaining the first reverberation parameter from the metadata or deriving the first reverberation parameter from the metadata, using the first reverberation parameter to derive a second reverberation parameter; and using the first reverberation parameter and the second reverberation parameter to render audio for a listener, wherein the second reverberation parameter is a different reverberation parameter than the first reverberation parameter, the second reverberation parameter is a reverberation level parameter, and the second reverberation parameter is derived using the first reverberation parameter and a time value.

2. The method of claim 1, wherein the first reverberation parameter is a reverberation time parameter, the metadata comprises an acoustical absorption parameter that indicates an amount of acoustical absorption (A), and the first reverberation parameter is derived using the acoustical absorption parameter.

3. The method of claim 1, wherein the first reverberation parameter is an acoustical absorption parameter that indicates an amount of acoustical absorption (A), the second reverberation parameter is a reverberant-to-direct (RDR) energy ratio value, and deriving the RDR energy ratio value comprises calculating: $16\times(\pi/A)$.

4. The method of claim 1, wherein the first reverberation parameter is a reverberation time parameter (RT), and deriving the second reverberation parameter comprises calculating $X\times RT$ or $RT/X$, where X is a number.

5. The method of claim 1, wherein the first reverberation parameter is a reverberation time parameter (RT), the first and second reverberation parameters are associated with an acoustical environment having a volume, and deriving the second reverberation parameter comprises calculating:

$f1\times(RT/V)$ or $(f1\times(RT/V)^{f2})$ where f1 is a predetermined coefficient, f2 is a predetermined value, and V is a volume value indicating the volume of the acoustical environment.

6. The method of claim 5, wherein f1 is equal to $C\times c$, where

C is a correction factor that depends on the first reverberation parameter and a time value (t1), and c is a predetermined value.

7. The method of claim 6, wherein C is equal to $$10^{-\left(\frac{6t1}{RT}\right)}.$$

8. The method of claim 6, wherein t1 is derived based on at least one dimension of the acoustical environment.

9. The method of claim 6, wherein t1 is proportional to the acoustic time-of-flight associated with a dimension of the acoustical environment.

10. The method of claim 9, wherein $t1=4\times L/s$, wherein L is the size of the longest dimension of the acoustical environment and s is speed of sound.

11. The method of claim 6, wherein t1 indicates a pre-delay time associated with the acoustical environment.

12. The method of claim 6, wherein t1 is a time value indicating a part of a room impulse response associated with the acoustical environment.

13. The method of claim 1, wherein the first and second reverberation parameters are associated with an acoustical environment having a volume, and the second reverberation parameter is a function of the volume of the acoustical environment.

14. The method of claim 1, wherein the first and second reverberation parameters are associated with an acoustical environment having a volume, the first reverberation parameter is a reverberation time parameter (RT), and deriving the second reverberation parameter comprises calculating:

$$10\log_{10}\left(\frac{RT}{V}\right) - 60\times\left(\frac{t1}{RT}\right) + 25\ (\text{dB})$$

where

V is the volume of the acoustical environment, and t1 is a time value.

15. The method of claim 14, wherein t1 is derived based on at least one dimension of the acoustical environment.

16. The method of claim 14, wherein t1 is a time value indicating a part of a room impulse response associated with the acoustical environment.

17. The method of claim 14, wherein t1 is proportional to the acoustic time-of-flight associated with a dimension of the acoustical environment.

18. The method of claim 17, wherein t1=4×L/s, wherein L is the size of the longest dimension of the acoustical environment and s is speed of sound.

19. The method of claim 14, wherein t1 indicates a pre-delay time associated with the acoustical environment.

20. The method of claim 1, wherein the reverberation level parameter is expressed in terms of an energy ratio between reverberant sound and total emitted energy of a source or an energy ratio between reverberant sound and direct sound of a source.

21. The method of claim 1, wherein using the first reverberation parameter and the second reverberation parameter to render audio for a listener comprises:

generating a reverberation signal using the first reverberation parameter and/or the second reverberation parameter; and generating an output audio signal using the reverberation signal.

22. An audio rendering apparatus, the audio rendering apparatus being configured to perform a process that includes:

obtaining metadata for an extended reality scene;

obtaining from the metadata, or deriving from the metadata, a first reverberation parameter, wherein the first reverberation parameter is a reverberation time parameter or an acoustical absorption parameter;

after obtaining the first reverberation parameter from the metadata or deriving the first reverberation parameter from the metadata, using the first reverberation parameter to derive a second reverberation parameter; and using the first reverberation parameter and the second reverberation parameter to render audio for a listener, wherein the second reverberation parameter is a different reverberation parameter than the first reverberation parameter, the second reverberation parameter is a reverberation level parameter, and the second reverberation parameter is derived using the first reverberation parameter and a time value.

23. The audio rendering apparatus of claim 22, wherein the first reverberation parameter is a reverberation time parameter, the metadata comprises an acoustical absorption parameter that indicates an amount of acoustical absorption (A), and the first reverberation parameter is derived using the acoustical absorption parameter.

24. The audio rendering apparatus of claim 22, wherein the first reverberation parameter is an acoustical absorption parameter that indicates an amount of acoustical absorption (A), the second reverberation parameter is a reverberant-to-direct (RDR) energy ratio value, and deriving the RDR energy ratio value comprises calculating: 16×(π/A).

* * * * *